US009496113B2

(12) United States Patent
Sanglier et al.

(10) Patent No.: US 9,496,113 B2
(45) Date of Patent: Nov. 15, 2016

(54) METHOD FOR COLD-CUTTING A LAMP

(71) Applicants: VEOLIA PROPRETE, Nanterre (FR); TRIADE ELECTRONIQUE, Nanterre (FR)

(72) Inventors: Christophe Sanglier, Colombes (FR); Aude Maitrot, Nanterre (FR); James Gautreau, Denée (FR)

(73) Assignees: VEOLIA PROPRETE, Nanterre (FR); TRIADE ELECTRONIQUE, Nanterre (FR)

( * ) Notice: Subject to any disclaimer, the term of this patent is extended or adjusted under 35 U.S.C. 154(b) by 50 days.

(21) Appl. No.: 14/649,041

(22) PCT Filed: Nov. 26, 2013

(86) PCT No.: PCT/FR2013/052854
§ 371 (c)(1),
(2) Date: Jun. 2, 2015

(87) PCT Pub. No.: WO2014/091108
PCT Pub. Date: Jun. 19, 2014

(65) Prior Publication Data
US 2015/0332886 A1 Nov. 19, 2015

(30) Foreign Application Priority Data

Dec. 11, 2012 (FR) ...................... 12 61866

(51) Int. Cl.
H01J 9/52 (2006.01)
B09B 3/00 (2006.01)
H01J 9/395 (2006.01)
H01J 9/40 (2006.01)
H01J 61/30 (2006.01)

(52) U.S. Cl.
CPC ............. *H01J 9/52* (2013.01); *B09B 3/0058* (2013.01); *H01J 9/395* (2013.01); *H01J 9/40* (2013.01); *H01J 61/305* (2013.01); *Y10T 83/0443* (2015.04)

(58) Field of Classification Search
CPC ........... B03B 7/00; B03B 9/062; B03B 1/00; H01J 9/52; H01J 9/40; H01J 9/395
See application file for complete search history.

(56) References Cited

U.S. PATENT DOCUMENTS

| 4,858,833 A * | 8/1989 | Hanulik ............ H01J 9/52 210/705 |
| 2012/0125371 A1* | 5/2012 | Kuramoto ......... H01J 9/52 134/22.11 |
| 2015/0122097 A1* | 5/2015 | Rhee ............... H01J 9/52 83/170 |

FOREIGN PATENT DOCUMENTS

| EP | 0 949 016 | 10/1999 |
| EP | 2 453 460 | 5/2012 |
| FR | 2 974 937 | 11/2012 |
| WO | WO 2012/150422 | 11/2012 |

OTHER PUBLICATIONS

PCT/FR2013/052854 International Search Report dated May 6, 2014 (4 pages including English translation).

* cited by examiner

*Primary Examiner* — Mariceli Santiago
(74) *Attorney, Agent, or Firm* — Brinks Gilson & Lione; G. Peter Nichols

(57) ABSTRACT

A method is described for cold-cutting a lamp having an inner pressure that is lower than the atmospheric pressure and containing a pollutant. The method includes keeping the lamp in position; cutting the lamp at at least one cutting point; prior to cutting, submerging the cutting point in a liquid or pasty composition; keeping the cutting point submerged during the cutting; and suctioning part of the composition into each cut-off portion. The composition is a dilatant and has a temperature no lower than the pour point thereof, prior to the cutting step. After the cutting, the temperature of the dilatant composition is reduced to a temperature lower than the pour point thereof, such as to increase the viscosity thereof and create a sealed stopper.

10 Claims, 2 Drawing Sheets

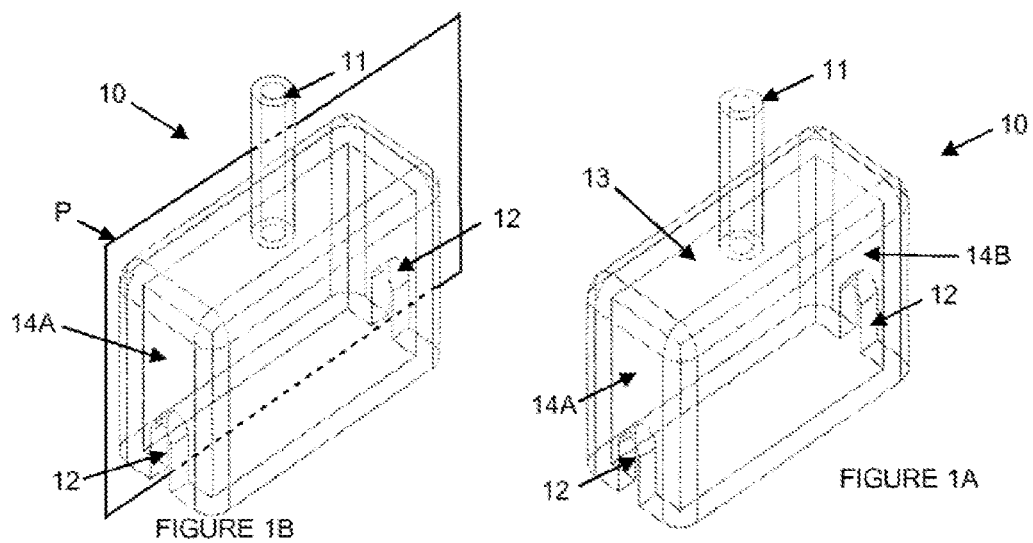
FIGURE 1B
FIGURE 1A
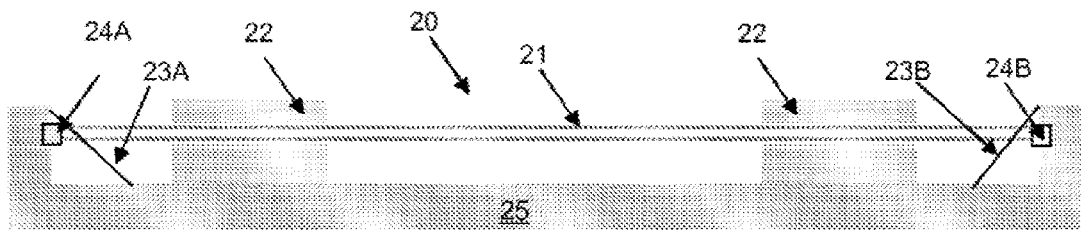
FIGURE 2A
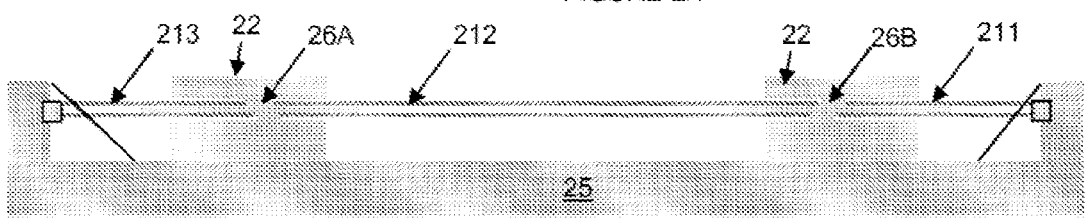
FIGURE 2B
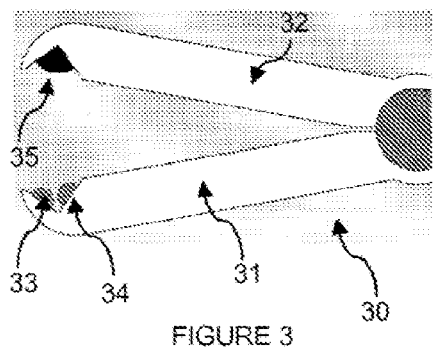
FIGURE 3

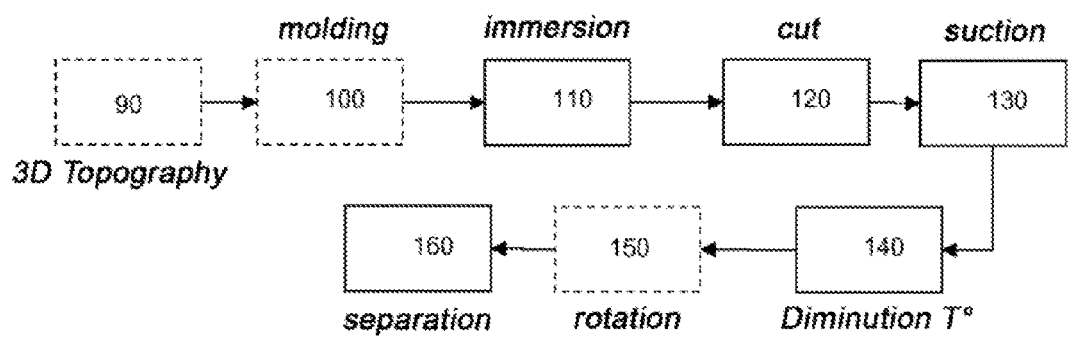
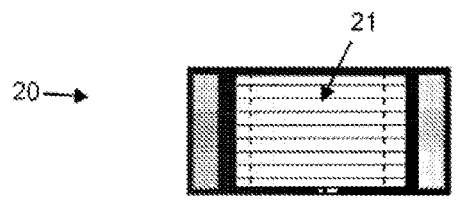
FIGURE 4
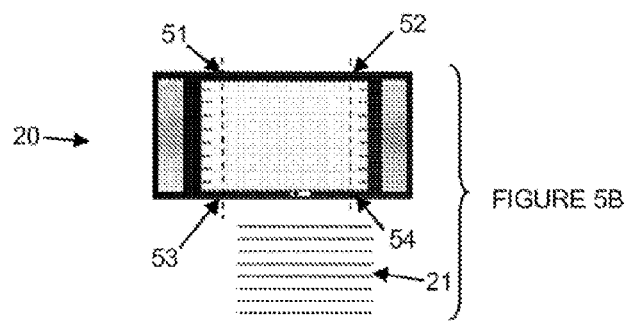
FIGURE 5A
FIGURE 5B
FIGURE 5C

METHOD FOR COLD-CUTTING A LAMP

This application claims priority to International Application No. PCT/FR2013/052854 filed Nov. 26, 2013 and to French Application No. 1261866 filed Dec. 11, 2012; the entire contents of each are incorporated herein by reference.

BACKGROUND

The present invention relates to the field of the depollution of cold cathodes.

A cold cathode is an electronic tube, vacuum tube or gas tube, comprising an envelope generally in glass or in ceramic and in which the pressure is lower than the atmospheric pressure; and at least one connector, secured to the envelope, and comprising typically electrodes and a cap or a holder.

For brevity sake, only one example will be cited here, that of a CCFL backlight tube within the framework of the dismantling of a flat screen, in particular LCD, at end-of-life. However, the invention can be more generally applicable to any fluorescent or neon lamp.

By convention, a cold cathode is hereinafter called "lamp".

The problem of cold cathodes is that they comprise pollutant materials, for example mercury, which is a hazardous waste and must be subject to a specific treatment so as not to be released into the atmosphere.

In order to treat a flat screen at end-of-life, there are currently three major types of dismantling:

The grinding solutions with depollution treatment of the vapor and ground elements.

Nevertheless, these solutions require heavy and expensive treatments.

The entirely manual dismantling solutions, where operators dismantle the screens with more or less ergonomic tools and equipments.

Nevertheless, these solutions are very lengthy, manual and economically nonviable.

The automated or semi-automated solutions involving technologies ensuring the dismantling without screen pollution (that is to say, no breakage of the slab, in particular LCD, or of the lamps).

One embodiment of the invention relates to this type of solutions.

In this context, the existing solutions aim essentially at keeping the integrity of the lamps, which may require to give access to the connectors linking the lamps to the screen, as described for example in the application FR2974937.

Other hot-cutting techniques aim at affecting the integrity of the lamps, as also described for example in the application FR2974937 in the shape of thermal pinching. There is also a technique consisting of melting the glass of the lamp, as described for example in the application WO2012150422, particularly advantageous especially when the connectors linking the lamps to the screen are not, or little, or hardly accessible.

SUMMARY

The present invention is a variant to this latter technique, and presents compared to the latter a lower thermal balance.

More precisely, the invention relates to a method for cold-cutting a lamp the inner pressure of which is lower than the atmospheric pressure, comprising an envelope, at least one connector secured to the envelope, and containing a pollutant, The method comprising steps consisting of:
maintaining the lamp in a predetermined cutting position, and
cutting the envelope into at least one cut point, and creating a first piece and a second piece on either side of each cut point.

Prior to the cutting step, immersing the cut point in a liquid or pasty composition,
maintaining the cut point immersed in the liquid or pasty composition during the cutting step, and
suctioning part of the liquid or pasty composition in each piece.

It is essentially characterized in that:
the liquid or pasty composition is a shear-thickening composition, the temperature of which, prior to the cutting step, is higher than or equal to its pour point, The method being characterized in that it further comprises a step consisting of:
subsequently to the cutting step, decreasing the temperature of the shear-thickening composition until a temperature lower than its pour point, so as to increase its viscosity and create a sealed stopper to the pollutant.

Preferably, a step consisting of separating the first piece from the second piece is further provided.

Thus, each piece can be individually treated.

In particular within the framework of the dismantling of a flat screen at end-of-life, it can be provided that the lamp is cut into two cut points so as to create a central part of the lamp and two end parts, the method further comprising, after the step of cutting into two cut points, a step consisting of removing the central part.

Which simplifies on the one hand the removal of the lamps relative to the platelets of the screens and the connectors; and simplifies on the other hand the treatment of the screen as the frame can be cut very simply without risking to break the lamps.

In one embodiment, it can be exactly provided that the lamp is a backlight lamp of a flat screen at end-of-life, the lamp being secured to the screen by the means of connectors, the method comprising, after removing the central part, a step consisting of cutting the screen into a plurality of cut points.

In one embodiment, a step consisting of rotating the central part of the lamp around its elongation axis can be provided.

Which allows, in particular when the viscosity of the shear-thickening composition has increased relative to its viscosity during the cutting, that the shear-thickening composition does not undergo a force in the elongation direction of the lamp, that is to say that the removal of a piece, in particular of the central part, does not risk to remove the shear-thickening composition from the inside of the envelope, that is to say the stopper.

In one embodiment, a step consisting of obtaining the three-dimensional topography of at least one part of the lamps is further provided.

This allows for example to automatically define the cut points, that is to say their coordinates as well as their depth.

In one embodiment, before the cutting step of the envelope, a step consisting of pouring, injecting or molding the shear-thickening composition into a mold.

Which allows for example to be able to use a same mold for a plurality of different screens.

In one embodiment, it is provided that the decrease of the temperature of the shear-thickening composition is artificial, the method comprising a thermal exchange step with a fluid whose temperature is lower than the ambient temperature.

Which allows to increase the increasing rate of the viscosity of the shear-thickening composition, and especially to create a stopper before the inner pressure is equal to the atmospheric pressure. Which allows to cut a lamp into two cut points, simultaneously or not.

In one embodiment, a step consisting of cutting the shear-thickening composition after solidification thereof is further provided.

This allows for example to limit the risks of breakage of the envelope during the removal.

Preferably, a prior step is provided consisting of heating the shear-thickening composition at an initial temperature (Ti) beyond a threshold temperature (Ts), higher than the ambient temperature, the threshold temperature (Ts) being higher than or equal to the pour point of the shear-thickening composition, the pour point of the shear-thickening composition being higher than the ambient temperature.

Which allows to obtain for the cutting step a liquid or pasty shear-thickening composition whose viscosity is lower than the viscosity of the shear-thickening composition during the separation step. The shear-thickening composition can therefore be suctioned into each cut piece and create a stopper therein while cooling.

Other features and advantages of the present invention will appear more clearly when reading the following description given by way of illustrative and non limiting example and made with reference to the annexed figures in which:

BRIEF DESCRIPTION OF THE DRAWINGS

FIG. 1A illustrates one embodiment of a mold according to the invention in a top three-quarter exploded view, FIG. 1B illustrates a plane of symmetry P for the mold of FIG. 1A, FIG. 2A illustrates a cross section of a flat screen comprising two studs of shear-thickening composition, FIG. 2B illustrates the suction of the shear-thickening composition in a lamp of the screen of FIG. 2A after cutting into two cut points, FIG. 3 illustrates an embodiment of a gripper equipped with at least three wheels according to the invention, FIG. 4 illustrates an embodiment of the method according to the invention, the dotted lines of which shows an optional nature, FIG. 5A illustrates the lamps of a flat screen from a front view, FIG. 5B illustrates the cutting of the lamps of the screen of FIG. 5A, according to the dotted lines of FIG. 5A and FIG. 5C illustrates the cutting of the screen of FIG. 5B, according to the dotted lines of FIG. 5B.

DETAILED DESCRIPTION

The invention intends to cut 120 a lamp 21 into at least one cut point 26A, 26B, and create a first piece 211 and a second piece 212 on either side of each cut point.

Yet, a lamp within the meaning of the invention comprises a pollutant, typically mercury. If the integrity of the lamp is affected, that mercury risks to discharge into the atmosphere or on the elements or components near the lamp, which can complicate or even compromise the valorization of recyclable fractions, in particular within the framework of the dismantling of a flat screen at end-of-life.

Furthermore, in a flat screen 20, the connectors 24A, 24B which link the lamps to the screen are generally inaccessible after removal of the slab and of the potential diffuser filters because they are still hidden by a platelet 23A, 23B.

The removal of the platelet can be complex and can risk to affect the integrity of the lamps in a non-controlled manner.

However, the inner pressure of the lamps is lower than the atmospheric pressure. The present invention aims to judiciously use this feature.

To this end, immersing 110 the cut point in a shear-thickening composition 22 prior to the cutting step is provided, and maintaining it in this shear-thickening composition during the cutting step 120, preferably until the viscosity thereof is such that it forms a hermetic stopper at the end of each lamp piece.

A shear-thickening composition is a chemical composition, the viscosity of which decreases with the increase of the temperature and vice-versa.

It can be provided, for example as shear-thickening composition, a chemical composition comprising at least one of the elements among the assembly comprising a colloidal solution, for example rehydrated starch, a fatty substance, wax, fat or mineral, vegetable or animal oil, a hydrocarbon, and in particular a paraffin, a resin or even a glue.

Before the cutting 120, the shear-thickening composition is liquid or pasty. For example a prior step is provided consisting of heating said composition at an initial temperature Ti beyond a threshold temperature Ts, higher than the ambient temperature. Preferably, the threshold temperature Ts is higher than or equal to the pour point of the shear-thickening composition, the pour point of a product being the temperature at which the latter begins to pour, the pour point of the shear-thickening composition being higher than the ambient temperature.

At the cutting moment, the temperature of the shear-thickening composition is preferably substantially identical to the initial temperature.

As there is inside the lamp a pressure lower than the atmospheric pressure, generally in the order of 100 mBar, when the envelope is cut, the balance of pressures naturally generates a suction phenomenon 130 in the envelope by the cut point. Thus, as the cut point is immersed in the shear-thickening composition and that the latter presents a temperature higher than its pour point, thus a viscosity sufficiently low to be suctioned, the shear-thickening composition 22 is naturally suctioned in each piece of lamp 211, 212, 213 at the cutting moment.

The lower the viscosity of the composition is and the more it is quickly suctioned by the lamp during the cutting. Conversely, the higher the viscosity is and the longer the suction time is. During this period, another cutting can therefore be carried out on the same lamp (with restrictions mentioned below) or on another lamp.

After the cutting, the temperature of the shear-thickening composition is decreased 140.

The temperature decrease of the shear-thickening composition can be natural, by thermal exchange with the ambient air. It is sufficient to wait until the temperature of the shear-thickening composition approximates the ambient temperature. The temperature decrease of the shear-thickening composition can be artificial, for example by thermal exchange with a fluid, in particular a gas, the temperature of which is lower than the ambient temperature. To this end, a gas ejection nozzle can be provided. It can be provided that the gas is air.

The temperature decrease of the shear-thickening composition increases the viscosity of the latter, its viscosity at ambient temperature is higher than its viscosity at initial temperature. At ambient temperature, the shear-thickening composition is solid or pasty. As the pour point is higher than the ambient temperature, the shear-thickening composition no longer pours at ambient temperature and then forms a stopper at the end of each lamp piece. Preferably, the stopper is sealed to the pollutant, in this case to gaseous mercury.

During the step 140 of cooling the shear-thickening composition after cutting 120 a cut point of a lamp, the immersing and cutting steps can be implemented on another cut point, on the same lamp or on another lamp. Preferably, at least one cut point by connector is provided per lamp. For the dismantling of a flat screen at end-of-life, two cut points 26A, 26B can be provided per lamp.

In the case where a lamp comprises a first 26A and a second 26B cut point, it can be provided that the two cuttings take place simultaneously or nearly simultaneously. It can also be provided that the two cuttings consecutively take place. The cutting at the second cut point 26B is to take place as long as the pressure in the lamp is lower than the atmospheric pressure, that is to say sufficient to suction part of the shear-thickening composition at said second cut point 26B.

It can be provided that the cutting at the second cut point 26B takes place before the suction of the shear-thickening composition at the first cut point 26A is finished.

The temperature of the shear-thickening composition can be for example artificially and preferably quickly decreased, at the first cut point 26A in the short term after the suction has started. The increase of the viscosity or even the solidification, increases the frictional forces of the shear-thickening composition on the inner walls of the lamp envelope. When the frictional forces are higher than the inner pressure of the lamp, the suction at the first cut point 26A stops. The inner pressure of the lamp can thus remain lower than the atmospheric pressure, which allows to suction subsequently part of the shear-thickening composition at the second cut point 26B.

In case of plurality of lamps 21 to be cut, it can be provided to immerse many cut points simultaneously or in series, and to cut them simultaneously (in parallel), or sequentially (in series). Similarly, it can be provided to immerse a first cut point then to cut a second immersed cut point, then to cut the first immersed cut point, etc. The immersing, cutting and separating order of the pieces of lamps between many lamps can be any one as long as the immersion of a given cut point is made before the cutting at this one. Preferably, the order depends on the configuration of the flat screen and of the shear-thickening composition, for example depending on its viscosity change rate depending on the temperature.

Cutting

The cutting of a lamp at each cut point can be carried out by any punctual cold cutting or crushing means, for example a gripper, a knife, a saw, a shear. Preferably the tools that risk to eject the shear-thickening composition such as a disc grinder or air/gas nozzles are avoided.

As the cut point is immersed and that the cutting tool passes through the shear-thickening composition 22 for the cutting 120, the shear-thickening composition advantageously traps the glass pieces once the cutting is carried out, which allows a subsequent treatment of the glass fragments, moreover likely to comprise the pollutant (s).

In order to immerse a cut point, the shear-thickening composition is placed on a support, for example on the bottom 25 of the flat screen being dismantled or an ad hoc support. It can also be placed in a mold 10, the bottom of which can eventually be constituted of the bottom of the flat screen being dismantled. Preferably, there exists a distance between the support or the bottom of the mold and the nearest point of the lamp envelope at the cut point.

Mold

For the immersion step 110, it can be intended to pour or inject the shear-thickening composition in a mold 10 in order to mold 100 said composition. It can be indifferently intended to firstly dispose the cut point in the mold and then to immerse it, or to firstly pour/inject the shear-thickening composition in the mold and then to immerse the cut point therein.

It can be intended to remove the mold before the cutting 120 or that the cutting takes place in the mold, for example depending on the viscosity of the shear-thickening composition.

The mold 10 comprises at least one opening 11 so that the shear-thickening composition can be injected/poured and an opening—optionally the same—so that the ambient air expelled by the shear-thickening composition can escape, for example in the shape of duct as illustrated in FIG. 1A and FIG. 1B. Another optionally identical opening (not illustrated) can be provided, to expel the ambient air. It can also be intended to suppress the upper face 13 of mold 10. This one is therefore open on the top, which can constitute the opening 11.

The mold 10 comprises at least two faces 14A, 14B facing each other, preferably parallel and preferably vertical, each of these faces comprising an opening 12, the shape of which fits at least partially the shape of the lamp envelope at the cut point. For a tubular lamp, an at least partially circular opening is preferably provided.

A unitary mold can be provided. Preferably, the opening 12 is U-shaped, so that the lamp envelope can be preferably radially inserted therein.

A mold composed of two articulated half molds can be provided. Each half mold presents an opening, in half U or half disk shape, configured to fit the shape of the envelope. Preferably, the two half molds are articulated so that each half mold is radially brought into opening/closing to the lamp envelope. Such a mold is partially illustrated in FIG. 1B. FIG. 1B represents the mold of FIG. 1A cut into two half molds according to the plane P, in this case a plane of symmetry. The two half molds are articulated, by non illustrated means, between an opening position where the two half molds are spaced from one another and a closing position where the two half molds are in contact with one another.

The mold 10 can comprise a bottom or not. For example, with a bottomless mold (FIG. 1A), optionally using the bottom 25 of the screen as mold bottom, and presenting an opening in a U shape, the advantage is that the same mold can be used for all the screens whose height between a lamp and the screen bottom is lower than the dimension of the U branches.

In the case where the mold does not comprise a bottom, or when the shear-thickening composition is directly deposited on the bottom of the screen, a shear-thickening composition with a low-strength adhesive is advantageously used, for example based on paraffin, which facilitates its subsequent removal, in particular if it solidifies.

A cutting tool that is secured to the mold can further be provided.

Separation

Once the lamp cut into at least two pieces, it is intended to separate 160 the first piece 211 from the second piece 212.

For example, see FIG. 5A, for a flat screen at end-of-life, some lamps are rectilinear and comprise a connector at each end, each connector of the lamp being connected to a corresponding connector 24A, 24B, secured to the screen. These connectors 24A, 24B are generally hidden behind a platelet, as previously mentioned.

Especially in this case, it can be intended to cut the lamp into two cut points 26A, 26B, each cut point being directly accessible, that is to say not hidden by a platelet, and preferably close to the platelet hiding the connector of the lamp, for all the lamps 21 of the screen 20. The dotted lines on FIG. 5A represent the cut lines of the lamps 21 for a flat screen 20.

It is then intended to separate 160 the central piece 212 of the two end pieces 211, 213. Each end piece can remain temporarily secured to the screen by means of the connectors 26A, 26B. But access to these ones as to the platelet is facilitated. The separation of the central piece can be made manually or mechanically, for example by a standard gripping tool, such a mechanical gripper. Preferably, the fingers of the gripping tool are equipped with a damping or soft surface (foam, rubber . . . ) to absorb part of the clamping forces and not to break the CCFL lamp.

After the separation, that is to say the removal of the central part 212 of the lamps, it can be intended to cut the edges of the screen near the remaining pieces of lamps, preferably perpendicularly in the direction of the elongation axis of the lamps as illustrated in FIG. 5B, or in parallel thereto. On FIG. 5B, the dotted lines represent screen cut lines into a plurality of screen cut points 51, 52, 53, 54.

The pieces of the cut screen (FIG. 5C) can therefore be retrieved, each screen piece comprising a lamp end connected to a connector. These pieces of screens can then be disassembled much more easily, for example by an operator.

In one optional embodiment, a gripper 30 equipped with at least three wheels 33, 34, 35 is provided, at least one of which can be motorized, that is to say controlled in rotation. The gripper comprises two branches 31, 32, each branch carrying at least one wheel. The wheels are configured to be in contact with the lamp envelope when the gripper is closed, so that when the gripper is activated, a rotation step 150 of the central part of a lamp can be implemented around its elongation axis after cutting into two cut points.

Preferably, during the separation step the shear-thickening composition is pasty, which allows a separation for example by shearing. If the shear-thickening composition is solidified, a shearing or a cutting step of the latter can be provided. The cutting of the shear-thickening composition can be made by the same cutting tool as the one used for the lamp, or by another tool. A separation by mechanical force can be also provided, for example by pulling on the lamp, manually or with a tool, for example a gripper, including a gripper equipped with at least three wheels mentioned above.

Laser Profilometry

In one embodiment there is provided a step 90 consisting of obtaining the (three-dimensional) topography, that is to say the position, the orientation in the space and the dimensions of a part at least of the lamps.

To this end, a step of laser profilometry can be provided, as described for example in the aforementioned application WO2012150422.

In the case of the dismantling of a flat screen, the laser profilometry also allows to define the position, the orientation in the space and the dimensions of the platelet (s) and of at least part of any element of the screen other than the lamps, preferably in the extension thereof, for example the casing.

For the laser profilometry, a laser projects a planar beam, resulting in a ray of light, for example over an area of the platelet and the lamps. The laser is inclined by a given angle $\alpha$, for example from 30° to 45°, with respect to the optical axis of a camera which scans an area where the laser ray is projected in reflection, so as to image the deformations of the ray due to relief, that is to say, to the geometry of the bottom of the screen, in this case of the lamps, the platelet or any other element of the screen illuminated by the ray of light. Preferably, the optical axis of the camera or the laser plane is orthogonal to the flat bottom.

The movement of the camera is secured to the movement of the laser, for example by being carried both by a robotic arm (not illustrated). This arm allows to produce a movement of translation (scanning) of the camera/laser assembly particularly parallel and/or perpendicular to the direction of the lamps. On each image of the camera, a more or less discontinuous line is observable. This line called profile represents the deformation of the laser ray on the illuminated relief by the ray of light.

The image processing of the profile by known algorithms allows to calculate, for example in the reference of the robot supporting the robotic arm, the coordinates of the relief elements encountered by the laser beam, thus the position, the orientation in the space and the dimensions of the lamps, of the potential platelets, casing, etc.

The invention claimed is:

1. A method for cold-cutting a lamp that has an inner pressure lower than atmospheric pressure, an envelope, at least one connector secured to the envelope, and contains a pollutant, the method comprising:
   maintaining the lamp in a predetermined cutting position;
   cutting the envelope into at least one cut point and creating a first piece and a second piece on either side of each cut point;
   prior to the cutting step, immersing the cut point in a liquid or pasty composition;
   maintaining the cut point immersed in the liquid or pasty composition during the cutting step;
   suctioning part of the liquid or pasty composition in each piece wherein the liquid or pasty composition is a shear-thickening composition and a temperature of the shear-thickening composition, prior to cutting, is higher than or equal to a pour point of the shear-thickening composition; and
   subsequent to the cutting step, decreasing the temperature of the shear-thickening composition to a temperature lower than the pour point, so as to increase its viscosity and to create a sealed stopper to the pollutant.

2. The cutting method according to claim 1, further comprising separating the first piece from the second piece.

3. The cutting method according to claim 1, wherein the lamp is cut into two cut points to create a central part of the lamp and two end parts and the method further comprises, after the step of cutting into two cut points, removing the central part.

4. The cutting method according to claim 3, wherein the lamp is a backlight lamp of a flat screen at end-of-life, the lamp being secured to the screen by means of connectors, and the method comprising, after removing the central part, cutting the screen into a plurality of cut points.

5. The method according to claim 3, further comprising rotating the central part of the lamp around its elongation axis.

6. The method according to claim 1, further comprising obtaining the three-dimensional topography of at least one part of the lamp.

7. The method according to claim 6, further comprising, before the step of cutting of the envelope, pouring, injecting or molding the shear-thickening composition into a mold.

8. The method according to claim 1, further comprising thermal exchange with a fluid that has a temperature lower than ambient temperature to decrease the temperature of the shear-thickening composition.

9. The method according to claim 1, further comprising cutting the shear-thickening composition after solidification of the latter.

10. The method according to claim 1, comprising heating the shear-thickening composition at an initial temperature (Ti) beyond a threshold temperature (Ts), that is higher than an ambient temperature, wherein the threshold temperature (Ts) is higher than or equal to the pour point of the shear-thickening composition, the pour point of the shear-thickening composition being higher than the ambient temperature.

* * * * *